US012628158B2

(12) United States Patent
Liu et al.

(10) Patent No.: US 12,628,158 B2
(45) Date of Patent: May 12, 2026

(54) SYSTEMS, METHODS, AND NON-TRANSITORY PROCESSOR-READABLE MEDIA FOR INDICATING REPETITION INFORMATION FOR RETRANSMISSIONS

(71) Applicant: ZTE CORPORATION, Shenzhen (CN)

(72) Inventors: Xing Liu, Shenzhen (CN); Xianghui Han, Shenzhen (CN); Peng Hao, Shenzhen (CN); Jing Shi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 400 days.

(21) Appl. No.: 18/240,941

(22) Filed: Aug. 31, 2023

(65) Prior Publication Data

US 2023/0413264 A1      Dec. 21, 2023

Related U.S. Application Data

(63) Continuation of application No. PCT/CN2021/142447, filed on Dec. 29, 2021.

(51) Int. Cl.
*H04W 72/1268*      (2023.01)
*H04W 72/232*      (2023.01)
*H04W 74/00*      (2009.01)

(52) U.S. Cl.
CPC ..... *H04W 72/1268* (2013.01); *H04W 72/232* (2023.01); *H04W 74/006* (2013.01)

(58) Field of Classification Search
None
See application file for complete search history.

(56) References Cited

U.S. PATENT DOCUMENTS

2020/0267043 A1*   8/2020   Chen ...................... H04L 27/36
2020/0413425 A1*  12/2020   Lin ....................... H04L 1/1864
2021/0105083 A1*   4/2021   Sarkis ................... H04L 1/1812
2021/0251016 A1*   8/2021   Xiong ................... H04L 1/1858
2021/0315000 A1*  10/2021   Li ......................... H04W 72/21
2021/0376951 A1*  12/2021   Singh ..................... H04L 5/22
(Continued)

FOREIGN PATENT DOCUMENTS

CN        113796144  A    12/2021
WO    WO-2020/222299 A1   11/2020
WO    WO-2021/231816 A1   11/2021

OTHER PUBLICATIONS

Apple Inc., "Discussion on Msg3 Coverage Enhancement"; 3GPP TSG RAN WG1 #104b-e R1-2103119, Apr. 12-20, 2021, e-Meeting, (3 pages).

(Continued)

*Primary Examiner* — Clemence S Han
(74) *Attorney, Agent, or Firm* — Foley & Lardner LLP

(57)      ABSTRACT

Systems, methods, non-transitory processor-readable media, and apparatuses for indicating repetition information for retransmissions, including receiving, by a wireless communication device from a network, control information, the control information including repetition information related to at least one repetition of a retransmission of an uplink transmission. The wireless communication device receives from the network the at least one repetition of the retransmission according to the repetition information.

14 Claims, 10 Drawing Sheets

1100

| MCS Index Indicated from First MCS Index List by RAR UL Grant for PUSCH Scheduled by RAR UL Grant | Second MCS Index List (MCS Index offset list = {0,1,2,3,4,5,6,7}) |
|:---:|:---:|
| 0 | {0,1,2,3,4,5,6,7} |
| 1 | {1,2,3,4,5,6,7,8} |
| 2 | {2,3,4,5,6,7,8,9} |
| 4 | {4,5,6,7,8,9,10,11} |

(56) References Cited

U.S. PATENT DOCUMENTS

2021/0378017 A1\*  12/2021  Luo ..................... H04W 74/006
2023/0074018 A1\*   3/2023  Nunome .............. H04W 72/23
2023/0141487 A1\*   5/2023  Chin ................. H04W 52/0235
                                                      370/328
2024/0292450 A1\*   8/2024  Wu ..................... H04W 74/006

OTHER PUBLICATIONS

International Search Report and Written Opinion for PCT Appl. No. PCT/CN2021/142447 mailed Jul. 28, 2022 (with English translation, 8 pages).
Wilus Inc., "Discussion on Type A PUSCH repetitions for Msg3"; 3GPP TSG RAN WG1 #104b-e R1-2103702, Apr. 12-20, 2021, e-Meeting, (6 pages).
Ericsson, "Procedure for Two-step RACH", 3GPP TSG-RAN WG1 Meeting #98, R1-1909123, Aug. 30, 2019, Prague, CZ (16 pages).
Extended European Search Report for EP Appl. No. 21969413.0, dated Oct. 24, 2024 (12 pages).
Moderator (ZTE Corporation), "Feature lead summary #1 on support of Type A PUSCH repetitions for Msg3", 3GPP TSG RAN WG1 #107-e, R1-2112556, Nov. 19, 2021, e-Meeting (49 pages).

\* cited by examiner

300

| RAR UL Grant Field | Number of bits |
|---|---|
| Frequency Hopping Flag | 1 |
| PUSCH Frequency Resource Allocation | 14, for operation without shared spectrum channel access<br><br>12, for operation with shared spectrum channel access |
| PUSCH Time Resource Allocation | 4 |
| MCS | 4 |
| TPC Command For PUSCH | 3 |
| CSI Request | 1 |
| Channelaccess-Cpext | 0, for operation without shared spectrum channel access<br><br>2, for operation with shared spectrum channel access |

FIG. 3

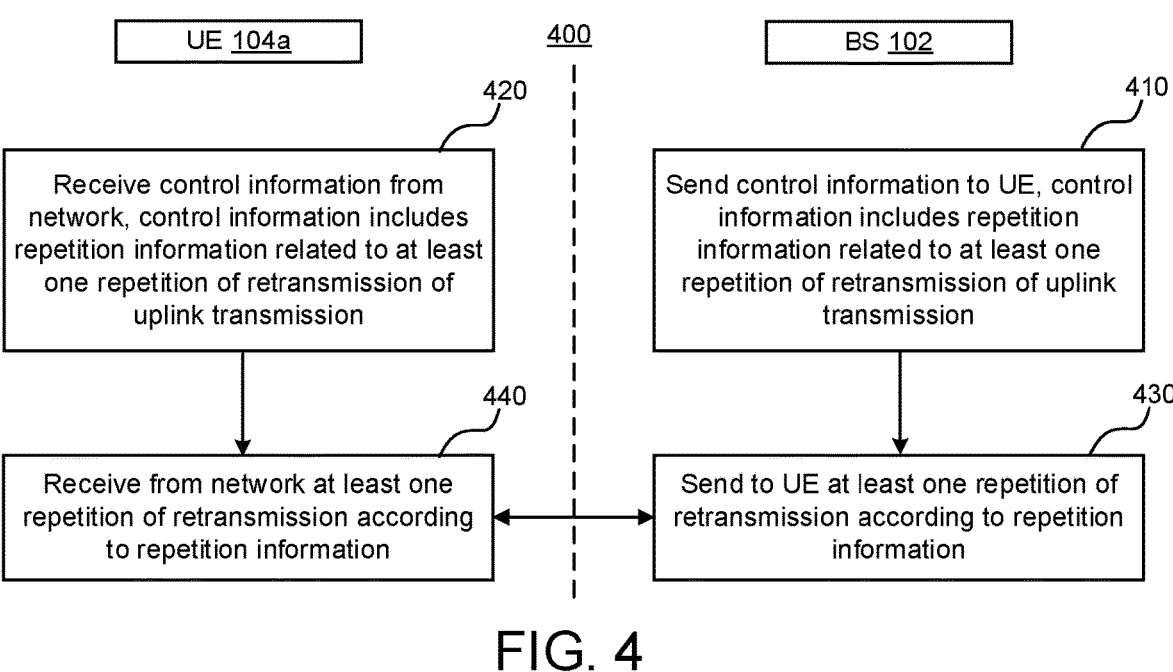
FIG. 4
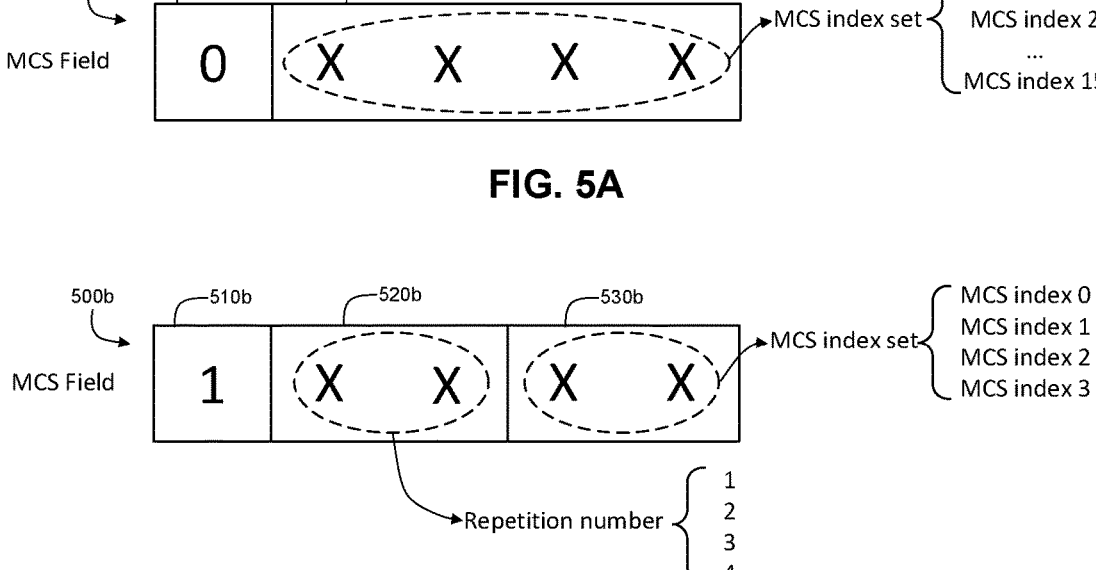
FIG. 5A
FIG. 5B

700

| Repetition Number Indicated by RAR UL Grant for PUSCH (Scheduled by RAR UL Grant) | Second Repetition Number Set (Offset Value Set = {0,1,2,3}) |
|---|---|
| 1 | {1,2,3,4} |
| 2 | {2,3,4,5} |
| 4 | {4,5,6,7} |
| 8 | {8,9,10,11} |

| Value of 2 MSB of MCS field | Value of Repetition Offset |
|---|---|
| 00 | 0 |
| 01 | 1 |
| 10 | 2 |
| 11 | 3 |

| Value of 3 LSB of MCS Field | MCS Index |
|---|---|
| 000 | 0 |
| 001 | 1 |
| 010 | 2 |
| 011 | 3 |
| 100 | 4 |
| 101 | 5 |
| 110 | 6 |
| 111 | 7 |

1000

| Value of 3 LSBs of MCS Field | MCS Index |
|---|---|
| 000 | 0 |
| 001 | 1 |
| 010 | 2 |
| 011 | 4 |
| 100 | 6 |
| 101 | 8 |
| 110 | 10 |
| 111 | 16 |

| MCS Index Indicated from First MCS Index List by RAR UL Grant for PUSCH Scheduled by RAR UL Grant | Second MCS Index List (MCS index offset list = {0,1,2,3,4,5,6,7}) |
|---|---|
| 0 | {0,1,2,3,4,5,6,7} |
| 1 | {1,2,3,4,5,6,7,8} |
| 2 | {2,3,4,5,6,7,8,9} |
| 4 | {4,5,6,7,8,9,10,11} |

| Value of 3 LSB of MCS Field | Value of MCS Index Offset |
|---|---|
| 000 | -4 |
| 001 | -3 |
| 010 | -2 |
| 011 | -1 |
| 100 | 0 |
| 101 | 1 |
| 110 | 2 |
| 111 | 3 |

| PRACH Occasion Index | Repetition Number of PUSCH Scheduled by RAR UL Grant |
|---|---|
| 1 | 1 |
| 2 | 2 |
| 3 | 4 |
| 4 | 8 |

| RA-RNTI Offset Index | Repetition Number of PUSCH Scheduled by RAR UL Grant |
|---|---|
| 1 | 1 |
| 2 | 2 |
| 3 | 4 |
| 4 | 8 |

FIG. 15

SYSTEMS, METHODS, AND NON-TRANSITORY PROCESSOR-READABLE MEDIA FOR INDICATING REPETITION INFORMATION FOR RETRANSMISSIONS

CROSS-REFERENCE TO RELATED APPLICATION

This application claims the benefit of priority under 35 U.S.C. § 120 as a continuation of PCT Patent Application No. PCT/CN2021/142447, filed on Dec. 29, 2021, the disclosure of which is incorporated herein by reference in its entirety.

TECHNICAL FIELD

The disclosure relates generally to wireless communications and, more particularly, to systems, methods, and non-transitory processor-readable media for indicating repetition information for transmissions.

BACKGROUND

Currently, the first phase standardization of the 5th Generation Mobile Communication Technology (5G) has already completed. A series features have been specified in the first three New Radio (NR) releases, i.e. Rel-15, Rel-16, and Rel-17. Coverage is one of the key factors in implementing cellular communication networks due to its direct impact on service quality as well as capital expenditure (CAPEX) and operational expenditure (OPEX). Despite the importance of coverage on the success of NR implementation, a thorough coverage evaluation and a comparison with legacy Radio Access Technologies (RATs) considering all NR specification details have not been performed until now.

SUMMARY

In some arrangements, systems, methods, apparatuses, and non-transitory computer-readable media for indicating repetition information for transmissions, including receiving, by a wireless communication device from a network, control information. The control information includes repetition information related to at least one repetition of a retransmission of an uplink transmission. In addition, the wireless communication device from the network, the at least one repetition of the retransmission according to the repetition information.

In some arrangements, systems, methods, apparatuses, and non-transitory computer-readable media for indicating repetition information for transmissions, including sending, by a network to a wireless communication device, control information. The control information comprises repetition information related to at least one repetition of a retransmission of an uplink transmission. In addition, the network sends to the wireless communication device, the at least one repetition of the retransmission according to the repetition information.

The above and other aspects and their implementations are described in greater detail in the drawings, the descriptions, and the claims.

BRIEF DESCRIPTION OF THE DRAWINGS

Various example arrangements of the present solution are described in detail below with reference to the following figures or drawings. The drawings are provided for purposes of illustration only and merely depict example arrangements of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 3 is a table illustrating information fields in a Random Access Response (RAR) uplink (UL) grant and size corresponding to each field, in accordance with some arrangements.

FIG. 4 is a flowchart diagram illustrating an example method for indicating repetition information for retransmissions, in accordance with some arrangements.

FIG. 5A is a diagram illustrating an example Modulation and Coding Scheme (MCS) field of a Downlink Control Information (DCI) format 0_0 used to indicate MCS indices and/or repetition numbers, in accordance with some arrangements.

FIG. 5B is a diagram illustrating an example MCS field of a DCI format 0_0 used to indicate MCS indices and/or repetition numbers, in accordance with some arrangements.

FIG. 7 is a table illustrating repetition numbers (first repetition number set) indicated by RAR UL grant for PUSCH scheduled by the RAR UL grant and the second repetition number set, in accordance with various arrangements.

FIG. 8 is a table illustrating example values of 2 bits of a MCS field and values of repetition offset, in accordance with various arrangements.

FIG. 10 is a table illustrating example mapping between the values of bits of a MCS field and MCS indices, in accordance with various arrangements.

FIG. 11 is a table illustrating example mapping between the MCS indices indicated from the first MCS index list by RAR UL grant for PUSCH scheduled by RAR UL grant and the second MCS index list, in accordance with various arrangements.

FIG. 14 is a table illustrating an example mapping between PRACH occasion indices and repetition numbers of PUSCH scheduled by the RAR UL grant, in accordance with some arrangements.

FIG. 15 is a table illustrating RA-RNTI offset indices and repetition numbers of PUSCH scheduled by RAR UL grant, according to various arrangements.

DETAILED DESCRIPTION

Various example arrangements of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example arrangements and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Among physical channels used during an initial access procedure or a handover procedure, Physical Uplink Shared Channel (PUSCH) is potential coverage bottleneck channel. Specifically, the PUSCH during an initial access procedure and a handover procedure includes initial transmission of Msg.3 (a PUSCH scheduled by RAR UL grant in Msg.2) and retransmission of Msg.3 (a PUSCH scheduled by DCI format 00 with Cyclic Redundancy Check (CRC) scrambled by a Temporary Cell-Radio Network Temporary Identifier (TC-RNTI).

The arrangements of the present disclosure relate to improving coverage of wireless communication networks by providing mechanisms for repetition transmission applied to Msg.3 and its retransmission, including indicating a repetition number.

Figure 1:
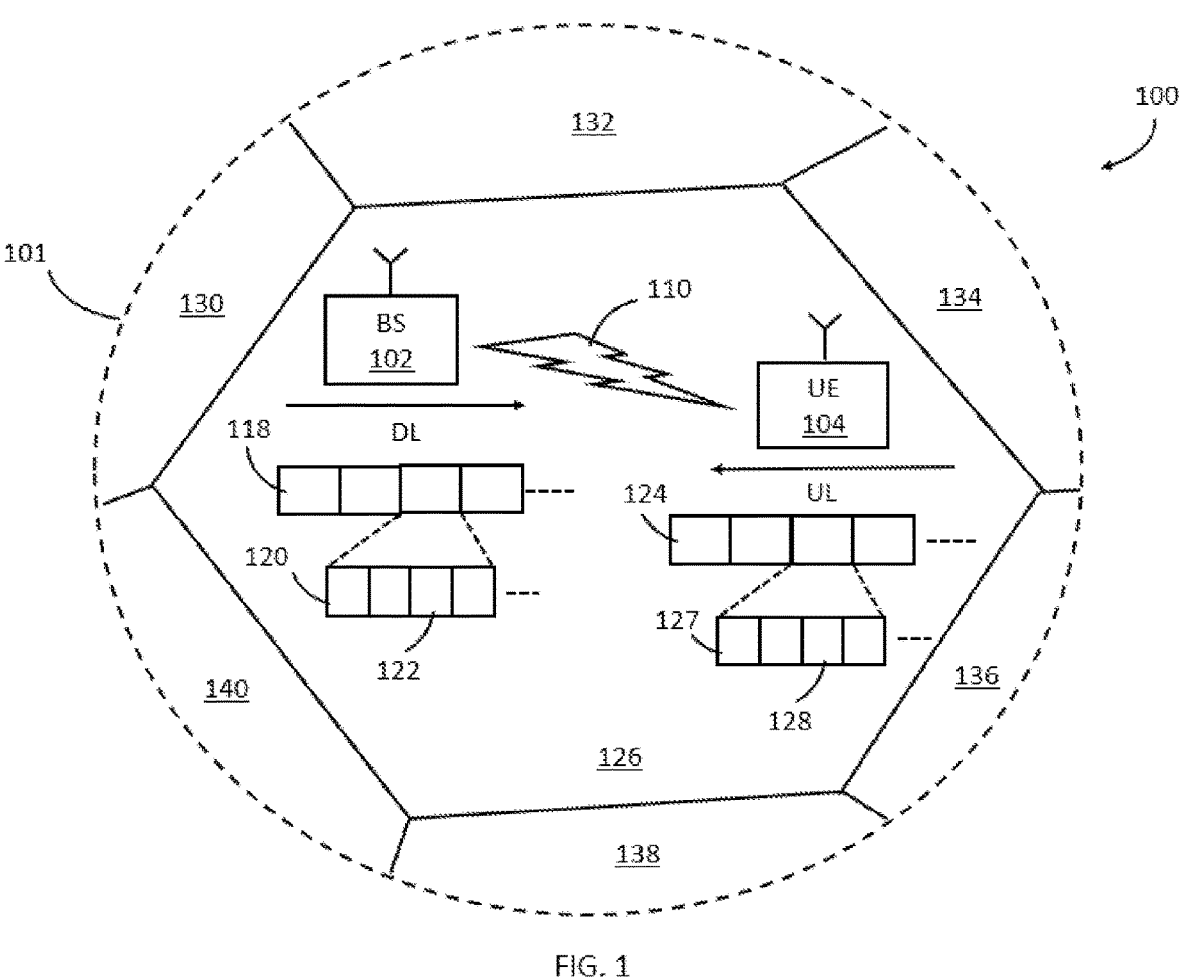
FIG. 1 is a diagram illustrating an example cellular communication network, in accordance with some arrangements.

FIG. 1 illustrates an example wireless communication network and/or system 100, in accordance with an arrangement of the present disclosure. In the following discussion, the wireless communication network 100 may be any wireless network, such as a cellular network or a narrowband Internet of things (NB-IoT) network. The network 100 includes a Base Station (BS) 102 and a UE 104 that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are shown to be located within a respective geographic boundary of cell 126. Each of the other cells 130, 132, 134, 136, 138 and 140 may include at least one BS operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various arrangements of the present solution.

Figure 2:
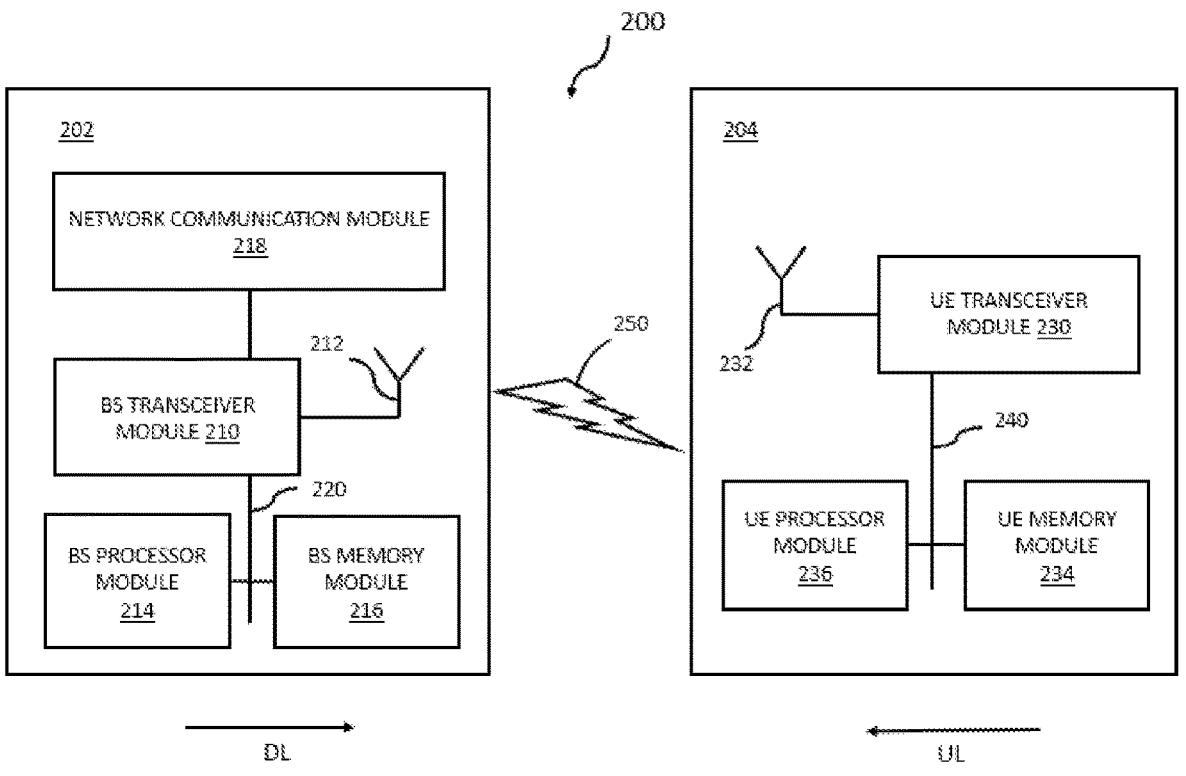
FIG. 2 illustrates block diagrams of an example base station and an example user equipment device, in accordance with some arrangements.

FIG. 2 illustrates a block diagram of an example wireless communication system 200 for transmitting and receiving wireless communication signals, e.g., OFDM/OFDMA signals, in accordance with some arrangements of the present solution. The system 200 may include components and elements configured to support known or conventional operating features that need not be described in detail herein. In one illustrative arrangement, system 200 can be used to communicate (e.g., transmit and receive) data symbols in a wireless communication environment such as the wireless communication environment 100 of FIG. 1, as described above.

System 200 generally includes a BS 202 and a UE 204. The BS 202 includes a BS transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the arrangements disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some arrangements, the UE transceiver 230 may be referred to herein as an uplink transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some arrangements, the BS transceiver 210 may be referred to herein as a downlink transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some arrangements, there is close time synchronization with a minimal guard time between changes in duplex direction.

The UE transceiver 230 and the BS transceiver 210 are configured to communicate via the wireless data communication link 250, and cooperate with a suitably configured RF antenna arrangement 212/232 that can support a particular wireless communication protocol and modulation scheme. In some illustrative arrangements, the UE transceiver 210 and the BS transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the BS transceiver 210 may be configured to support alternate, or additional, wireless data communication protocols, including future standards or variations thereof.

In accordance with various arrangements, the BS 202 may be an gNB, evolved node B (eNB), a serving eNB, a target eNB, a femto station, or a pico station, for example. In some arrangements, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the arrangements disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some arrangements, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the BS 202 that enable bi-directional communication between BS transceiver 210 and other network components and communication nodes configured to communication with the BS 202. For example, network communication module 218 may be configured to support internet or WiMAX traffic. In a typical deployment, without limitation, network communication module 218 provides an 802.3 Ethernet interface such that BS transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

With regard to repetition of dynamic scheduling PUSCH, the DCI for scheduling the uplink data is transmitted according to a predefined rule. In some examples, the DCI is transmitted only one time. Then, the uplink data carried on PUSCH is transmitted at indicated, configured, or predefined times. Similarly, the repetition transmission is also applied to Configured Grant-PUSCH (CG-PUSCH). That is, the CG-PUSCH is transmitted at configured or predefined times without a scheduling DCI.

During an initial access procedure and a handover procedure, a PUSCH can be scheduled by RAR UL grant, and the retransmission of the PUSCH can be scheduled by DCI format 0_0 with CRC scrambled by TC-RNTI. Some arrangements relate to indicating the repetition number of PUSCH during the initial access procedure and the handover procedure.

In some examples of an initial access flow, the UE first detects the synchronization signal and receives the corresponding Physical Broadcast Channel (PBCH). Then, the UE obtains the monitoring configuration of the System Information Block 1 (SIB1) Physical Downlink Control Channel (PDCCH) from the Master Information Block (MIB) carried on the PBCH and obtains the configuration information needed for uplink access from the Physical Downlink Shared Channel (PDSCH) scheduled by the SIB1 PDCCH.

Then, the UE sends the Physical Random Access Channel (PRACH), which is also referred to as preamble or Msg.1 in a PRACH occasion and initiate the random access procedure. In response to a PRACH transmission, a UE monitors for and attempts to detect a DCI format 1_0 with CRC scrambled by a corresponding Random Access-RNTI (RA-RNTI) during a window controlled by higher layers. A PDSCH for RAR, which is also referred to as Msg.2, is scheduled by the DCI format 1_0 with CRC scrambled by a corresponding RA-RNTI. The RA-RNTI is calculated according the time and frequency domain resource of the PRACH transmitted by the UE. For example, can be computed as:

$$RA\text{-}RNTI = 1 + s\_id + 14 \times t\_id + 14 \times 80 \times f\_id + 14 \times 80 \times 8 \times ul\_carrier\_id \quad (1),$$

where s_id is the index of the first Orthogonal Frequency Division Multiplexing (OFDM) symbol of the PRACH occasion (e.g., $0 \le s\_id < 14$). In addition, t_id is the index of the first slot of the PRACH occasion in a system frame (e.g., $0 \le t\_id < 80$). The subcarrier spacing for determining t_id is based on the value of specified in clause 5.3.2 in TS 38.211 [8]. Furthermore, f_id is the index of the PRACH occasion in the frequency domain (e.g., $0 \le f\_id < 8$), and ul_carrier_id is the uplink carrier used for Random Access Preamble transmission (e.g., 0 for Normal UL (NUL) carrier, and 1 for Supplemental UL (SUL) carrier).

A RAR UL grant is carried on the PDSCH for RAR. The RAR UL grant can be a Media Access Control (MACO layer signaling. The RAR UL grant is used for indicating UL grant information of a PUSCH. The PUSCH scheduled by a RAR UL grant can also be referred to as Msg.3 PUSCH in the Contention Based Random Access (CBRA) procedure. The information fields in the RAR UL grant and corresponding size for each field are shown as FIG. 3, table 300. As shown in the table 300, the RAR UL grant field has 1 bit to identify a frequency hopping flag, 12 or 14 bits for defining PUSCH frequency resource allocation (e.g., 14 for operations without shared spectrum channel access or 12 for operation with shared spectrum channel access), 4 bits for defining PUSCH time resource allocation, 4 bits to identify the MCS, 3 bits to identify the Transmit Power Command (TPC) command for PUSCH, 1 bit for the CSI request, and 0 or 2 bits for channelaccess-Cpext (e.g., 0 bit for operations without shared spectrum access and 2 bits for operations with shared spectrum channel access).

In some examples, the repetition number can be indicated through using a MCS field in the RAR UL grant. More specifically, with respect to the 4 bits for MCS field in RAR UL grant, 2 Most significant Bits (MSBs) can be used to indicate the repetition number of the PUSCH scheduled by the RAR UL grant. A list with at most four repetition numbers (e.g., {1, 2, 4, and 8}) can be configured via RRC signaling. If a value is not configured, some default values can be used (e.g., {1, 2, 3, 4}). Then, 2 MBSs of the MCS field are indicated, each of which is from the list of values. In some examples, 2 Least Significant Bits (LSBs) of the MCS field can be used for indicating MCS from a configured set of MCS indices, e.g., {0, 2, 4, 8}. Similarly, if the MCS index is not configured, some default values will be used, e.g., {0, 1, 2, 3}.

If repetition number of the retransmission of Msg.3 PUSCH uses the same mechanism as that supported for the initial transmission of Msg3, the MCS field in DCI format 0_0 with CRC scrambled by TC-RNTI is used to indicate the repetition number of the retransmission of Msg. However, there are 5 in the MCS field in DCI format 00, which is different from that in RAR UL grant. Thus, the same mechanism cannot be applied directly. Furthermore, PRACH repetition is potentially supported in the future releases. The present arrangements allow compatibility with PRACH repetition.

Some arrangements allow indication of repetition number of PUSCH scheduled by RAR UL grant or by DCI format 0_0 with CRC scrambled by TC-RNTI. FIG. 4 is a flowchart diagram illustrating an example method 400 for indicating repetition information for retransmissions, in accordance with some arrangements. Referring to FIGS. 1-4, the method 400 is can be performed by the UE 104 and the network (e.g., the BS 102). The number of repetitions can be effectively indicated without additional signaling overhead and without significantly increasing the detection complexity of the UEs.

At 410, the network (e.g., the BS 102) sends control information to the UE 104. The control information includes repetition information related to at least one repetition of a retransmission of an uplink transmission. At 420, the UE 104 receives from the network the control information. In some examples, the control information includes a DCI format 0_0. The DCI format 0_0 is CRC scrambled by a TC-RNTI. In some examples, the network sends to the UE 104 and the UE 104 receives from the network an uplink grant (e.g., the RAR UL grant) scheduling the uplink transmission. The retransmission is the PUSCH scheduled by the DCI format 0_0.

In some arrangements, the control information includes an information field containing the repetition information. The information field includes an indicating bit. The information field includes a MCS field. The indicating bit indicates whether the at least one repetition of the retransmission is configured in some arrangements. In some arrangements, the UE 104 interprets at least another bit in the information field based on the indicating bit. In some arrangements, the UE determines, according to the indicating bit, that at least one first bit of the at least another bit indicates a repetition number of the at least one repetition of the retransmission, and at least one second bit of the least another bit indicates a MCS index. In some arrangements, the UE 104 determines according to the indicating bit that all of the at least another bit indicates a MCS index.

In some arrangements, the UE 104 sends to the network a request for the at least one repetition of the retransmission. The indicating bit indicates that at least another bit indicates a repetition number of the at least one repetition of the retransmission. In some arrangements, the UE 104 receives from the network configuration information indicating the at least one repetition of the uplink transmission. For example, the configuration information indicates that repetition is configured for the initial transmission of the uplink transmission (PUSCH scheduled by the RAR UL grant). In this case, the indicating bit indicates that at least another bit indicates a repetition number of the at least one repetition of the retransmission.

In some arrangements, the UE 104 determines, based on the indication bit, whether a repetition number of the at least one repetition of the retransmission is same as a repetition number of at least one repetition of the uplink transmission (PUSCH scheduled by the RAR UL grant).

In some arrangements, the UE 104 determines (e.g., receives from the network) a repetition number of the at least one repetition of the retransmission based on a repetition number of at least one repetition of the uplink transmission (PUSCH scheduled by the RAR UL grant) and a repetition offset. In some arrangements, the UE 104 determines a repetition number set by adding the repetition number of the at least one repetition of the uplink transmission to every element of a repetition offset set. The repetition number of the at least one repetition of the retransmission is from the repetition number set. In some arrangements, the UE 104 determines the repetition number of the at least one repetition of the retransmission by adding the repetition offset from a repetition offset set to the repetition number of the at least one repetition of the uplink transmission.

In some arrangements, the UE 104 determines an RA-RNTI based on a PRACH occasion of a plurality of PRACH occasions. The UE 104 determines a repetition number of at least one repetition of the uplink transmission based on the PRACH occasion.

In some arrangements, the UE 104 determines an initial RA-RNTI based on a PRACH occasion. The UE 104 determines a repetition number of at least one repetition of the uplink transmission based on the initial RA-RNTI and an RA-RNTI offset.

At 430, the network sends to the UE 104 at least one repetition of the retransmission according to the repetition information. At 440, the UE receives from the network the at least one repetition of the retransmission according to the repetition information.

Some arrangements related to indicating a repetition number of retransmissions of a PUSCH scheduled by a RAR UL grant. In some arrangements, one bit of an existing information field in DCI format 0_0 with CRC scrambled by TC-RNTI is used to indicate the manner in which the remaining bits in the existing information field are to be interpreted. Such bit can be referred to as the indicating bit. For example, the existing information field in the DCI format 0_0 can be a MCS field. The indicating bit can be the 1 MSB, 1 LSB, or one bit with a predefined position in the MCS field. More specifically, the different values of this indicating bit indicate different interpretations of the remaining 4 bits of MCS field in DCI format 0_0. For example, the indicating bit with the value "1" represents Interpretation 1 while the indicating bit with the value "0" represents Interpretation 2.

In Interpretation 1, N bits (e.g., 0<N<4) of the remaining 4 bits of MCS field in DCI format 0_0 are used to indicate the repetition number of PUSCH scheduled by the DCI format 0_0. In addition, another M=(4−N) bits of the remaining 4 bits are used to indicate the MCS of the PUSCH scheduled by the DCI format 0_0.

In Interpretation 2, all of the remaining 4 bits of the MCS field in DCI format 0_0 are used to indicate the MCS of the PUSCH scheduled by the DCI format 0_0.

In some arrangements, the indicating bit can also be used to indicate whether repetition is configured for PUSCH transmission scheduled by the DCI format 0_0. For example, the indicating bit with value "1" represents that repetition transmission is configured for the PUSCH, and the repetition number is indicated by N (e.g., N=2) bits of the remaining 4 bits of MCS field in DCI format 0_0. Another M=(4−N) (e.g., 2 bits) of the remaining 4 bits are used to indicate the MCS of the PUSCH scheduled by the DCI format 0_0. On the other hand, the indicating bit with value "0" represents that repetition transmission is not configured by the network for the PUSCH. In such example, all of the remaining 4 bits are used to indicate the MCS of the PUSCH scheduled by the DCI format 0_0.

In some examples, the PUSCH is scheduled by DCI format 0_0 with CRC scrambled by TC-RNTI. The PUSCH is the retransmission of a PUSCH scheduled by RAR UL grant. FIG. 5A is a diagram illustrating an example MCS field 500a of a DCI format 0_0 used to indicate MCS indices and/or repetition numbers, according to various arrangements. FIG. 5B is a diagram illustrating an example MCS field 500b of a DCI format 0_0 used to indicate MCS indices and/or repetition numbers, according to various arrangements. In the MCS field 500a and the MCS field 500b, 1 MSB with CRC scrambled by TC-RNTI is the indicating bit 510a/510b.

In the MCS field 500a in which the value of the indicating bit 510a set to "0," repetition transmission is not configured by the network for the PUSCH scheduled by the DCI format 0_0. Thus, the indicating bit 510a represents that the remaining bits 520b (e.g., 4 LSB) of the MCS field 500a in the DCI format 0_0 are used for indicating an MCS index from an MCS index set. For example, the MCS index set has at most 16 MCS indices identifiable by the 4 remaining bits 520b. The network can configure the MCS index set via RRC signaling. If the MCS index set is not configured by the network, the UE uses an MCS index set with default MCS indices (e.g., MCS indices 0~15).

On the other hand, in the MCS field 500b in which the value of the indicating bit 510b set to "0," repetition transmission is configured for the PUSCH scheduled by the DCI format 0_0. Thus, the indicating bit 510b represents that N bits 530b of the remaining bits of the MCS field 510b (e.g., 0<N<4, e.g., N=2 and 2 LSB of the MCS field 500b) in the DCI format 0_0 are used for indicating an MCS index from an MCS index set with at most M=2^N=4 MCS indices. The MCS indices within the MCS index set can be configured by the network via RRC signaling. If the MCS index set is not configured, the UE uses an MCS index set with default MCS indices (e.g., MCS index 0~3).

In some arrangements, another (4−N) bits 520b (the second bit and the third bit) of the MCS field 500b are used for indicating a repetition number from a repetition number set with at most P=2^{(4−N)}=4 repetition numbers. The repetition numbers in the repetition number set can be configured by the network via RRC signaling. If the network does not configure the repetition numbers in the repetition number set, a repetition number set with default values (e.g., repetition numbers 1, 2, 3, 4) is used. In some examples, the repetition number with in the repetition number set is greater than 1, as the indicating bit 510b indicates that there is repetition transmission for the PUSCH.

Accordingly, in some arrangements, the control information includes an information field containing the repetition information. The information field includes an indicating bit. The information field includes a MCS field. The indicating bit indicates whether the at least one repetition of the retransmission is configured in some arrangements. In some arrangements, the UE interprets at least another bit in the information field based on the indicating bit. In some arrangements, the UE determines, according to the indicating bit, that at least one first bit of the at least another bit indicates a repetition number of the at least one repetition of the retransmission, and at least one second bit of the least another bit indicates a MCS index. In some arrangements, the UE determines according to the indicating bit that all of the at least another bit indicates a MCS index.

Some arrangements relate to indicating a repetition number of retransmission of PUSCH scheduled by a RAR UL grant. Retransmission of a PUSCH scheduled by RAR UL grant is scheduled by a DCI format 0_0 with CRC scrambled by TC-RNTI. In some examples in which the UE requests repetition transmission or the network configures the repetition transmission for the PUSCH scheduled by RAR UL grant, the UE accordingly interprets the MCS field in the DCI format 0_0 with CRC scrambled by TC-RNTI for scheduling the retransmission of the PUSCH. For example, N=2 bits (e.g., 2 MSBs) of the MCS field in the DCI format 0_0 are used for indicating the repetition number of PUSCH scheduled by the DCI format 0_0. In addition, another (5−N)=3 bits (e.g., 3 LSBs) of the MCS field in DCI format 0_0 are used for indicating a MCS for the PUSCH scheduled by the DCI format 0_0.

Figure 6:
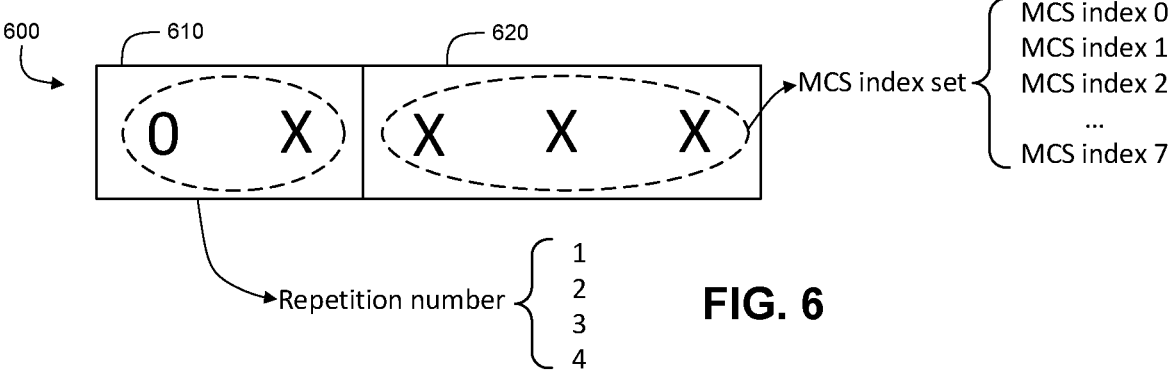
FIG. 6 is a diagram illustrating an example MCS field of a DCI format 0_0 used to indicate MCS indices and/or repetition numbers, in accordance with some arrangements.

FIG. 6 is a diagram illustrating an example MCS field 600 of a DCI format 0_0 used to indicate MCS indices and/or repetition numbers, according to various arrangements. As an example shown in FIG. 6, in response to the UE requesting repetition transmission or the network (e.g., the BS 102) configures the repetition transmission for the PUSCH scheduled by RAR UL grant, 2 MSBs 610 of the MCS field 600 in DCI format 0_0 are used for indicating the repetition number from a repetition number set with at most M=2^N=4 repetition numbers. The repetition numbers within the repetition number set can be configured by the network via RRC signaling. In the examples in which the network does not configure the repetition numbers in the repetition number set, the UE uses default values (e.g., 1, 2, 3, 4) for the repetition number set. Another 3 LSBs 620 bits of the MCS field 600 in DCI format 0_0 are used for indicating an MCS index for the PUSCH scheduled by the DCI format 0_0. The MCS index can be from an MCS index set with at most P=2^{(5−N)}=8 MCS indices. In the examples in which the network does not configure the MCS indices in the MCS index set, the UE uses a default values (e.g., MCS index 0~7).

On the other hand, in some arrangements in which the UE does not request repetition transmission or the network does not configure the repetition transmission for the PUSCH scheduled by RAR UL grant, In some arrangements, the indicating bit in the MCS field of the DCI format 0_0 scrambled by TC-RNTI is used to indicate how to interpret the remaining bits in the MCS field. The indicating bit can be the 1 MSB, 1 LSB, or one bit with a predefined in the MCS field. More specifically, the different values of this indicating bit indicate different interpretations of the remaining 4 bits of MCS field in DCI format 0_0. For example, the indicating bit with the value "1" represents Interpretation 1 while the indicating bit with the value "0" represents Interpretation 2.

In Interpretation 1, A bits (e.g., A=2) of the remaining 4 bits of the MCS field in DCI format 0_0 are used to indicate the repetition number of PUSCH scheduled by the DCI format 0_0. In addition, another B=(4−A)=2 bits of the remaining 4 bits are used to indicate the MCS of the PUSCH scheduled by the DCI format 0_0.

In Interpretation 2, all of the remaining 4 bits of the MCS field in DCI format 0_0 are used to indicate the MCS of the PUSCH scheduled by the DCI format 0_0.

In some arrangements, the indicating bit can also be used to indicate whether repetition is configured for PUSCH transmission scheduled by the DCI format 0_0. For example, the indicating bit with value "1" represents that repetition transmission is configured for the PUSCH, and the repetition number is indicated by A (e.g., A=2) bits of the remaining 4 bits of MCS field in DCI format 0_0. Another B=(4−A) (e.g., 2 bits) of the remaining 4 bits are used to indicate the MCS of the PUSCH scheduled by the DCI format 0_0. On the other hand, the indicating bit with value "0" represents that repetition transmission is not configured by the network for the PUSCH. In such example, all of the remaining 4 bits are used to indicate the MCS of the PUSCH scheduled by the DCI format 0_0.

In some arrangements in which the UE does not request repetition transmission or the network does not configure repetition transmission for the PUSCH scheduled by RAR UL grant, all bits of the MCS field in DCI format 0_0 with CRC scrambled by TC-RNTI are used for indicating the MCS index. There is no repetition for the transmission scheduled by the DCI format 0_0.

Accordingly, in some arrangements, the 104 sends to the network a request for the at least one repetition of the uplink transmission. One or more bits in DCI format 0_0 indicate a repetition number of at least one repetition of the PUSCH scheduled by the DCI format 0_0, e.g., the retransmission of the uplink transmission. In some arrangements, the UE receives from the network configuration information indicating the at least one repetition of the uplink transmission. For example, the configuration information indicates that repetition is configured for the initial transmission of the uplink transmission. In this case, one or more bits in DCI format 0_0 indicate a repetition number of the PUSCH scheduled by the DCI format 00, i.e., the retransmission of the uplink transmission.

Some arrangements relate to indicating a repetition number of retransmission of PUSCH scheduled by a RAR UL grant. The network schedules retransmission of a PUSCH scheduled by RAR UL grant using a DCI format 0_0 with CRC scrambled by TC-RNTI. The network configures for a UE a first repetition number set via RRC signaling for PUSCH scheduled by RAR UL grant. In some arrangements, 2 bits (e.g., 2 MBSs) of the MCS field in RAR UL grant are used for indicating a repetition number from the first repetition number set. The network uses an indicating bit (e.g., the third bit) of a MCS field in DCI format 0_0 with CRC scrambled by TC-RNTI to indicate whether a repetition number for the retransmission PUSCH (e.g., the PUSCH scheduled by the DCI format 00) is the same as the repetition number for the initial PUSCH (e.g., the PUSCH scheduled by RAR UL grant).

For example, the indicating bit with the value "1" represents that the repetition number for retransmission and the repetition number for the initial transmission are the same. In this case, all remaining 4 bits (e.g., 4 LSBs) of the MCS field are used to indicate a MCS index for the retransmission PUSCH.

On the other hand, the indicating bit with value "0" represents that a different repetition number for the retransmission is used as compared to the repetition number for the initial transmission. In this case, another N bits (e.g., N=2, the second bit and the third bit) of the MCS field are used for indicating a repetition number for retransmission PUSCH. The repetition number for the retransmission PUSCH is from a second repetition number set with at most $2^N=4$ repetition numbers.

In some examples, the network can configure the second repetition number set via RRC signaling. In some examples, the second repetition number set can be a predefined set, e.g., including repetition numbers 1, 2, 3, 4. In some examples, the second repetition number set is the same as the first repetition number set.

Accordingly, in some arrangements, the UE determines, based on the indication bit, whether a repetition number of the at least one repetition of the retransmission is same as a repetition number of at least one repetition of the uplink transmission (PUSCH scheduled by the RAR UL grant).

Some arrangements relate to indicating a repetition number of retransmission of PUSCH scheduled by a RAR UL grant. For a PUSCH scheduled by RAR UL grant, the retransmission of the PUSCH is scheduled by a DCI format 0_0 with CRC scrambled by TC-RNTI. The network configures first repetition number set via RRC signaling for the UE. A repetition number for the PUSCH scheduled by RAR UL grant is indicated by the RAR UL grant, where the repetition number is from the first repetition number set. In addition, the network configures a repetition offset set (e.g., {0, 1, 2, 3}) via RRC signaling for the UE. There are as most $2^N$ elements in the repetition offset set. In some arrangements, the UE determines (e.g., receives from the network) a repetition number of the at least one repetition of the retransmission based on a repetition number of at least one repetition of the uplink transmission (PUSCH scheduled by the RAR UL grant) and a repetition offset.

In some arrangements, the UE 104 determines a repetition number set (e.g., a second repetition number set) by adding the repetition number of the at least one repetition of the uplink transmission to every element of a repetition offset set. The repetition number of the at least one repetition of the retransmission is from the repetition number set. In some arrangements, a second repetition number set of PUSCH scheduled by a DCI format 0_0 with CRC scrambled by TC-RNTI is determined according the repetition offset and the repetition number indicated by RAR UL grant. FIG. 7 is a table 700 illustrating example repetition numbers (the first repetition number set) indicated by RAR UL grant for PUSCH scheduled by the RAR UL grant and an example second repetition number set, in accordance with various arrangements. As shown in table 700, the first repetition number set is configured as {1, 2, 4, 8}. One of the repetition number from the first repetition number set will be indicated via RAR UL grant. Thus, the repetition number indicated by the RAR UL grant for the PUSCH scheduled by the RAR UL grant can be one of 1, 2, 4, and 8. The repetition offset set has a size of $2^N$ (e.g., N=2, and $2^N=4$). For example, the offset values in the repetition offset set can configured as {0, 1, 2, 3}. Thus, the second repetition number set can be determined according to the repetition number indicated by RAR UL grant (from the first repetition number set) and the repetition offset set. For example, each element in the second repetition number set is calculated by adding the repetition number indicated by the RAR UL grant with each element of the repetition offset set.

More specifically, for the repetition number "1" indicated by the RAR UL grant, the second repetition number set can be determined as {1+0, 1+1, 1+2, 1+3}={1, 2, 3, 4}. For the repetition number "2" indicated by RAR UL grant, the second repetition number set can be determined as {2+0, 2+1, 2+2, 2+3}={2, 3, 4, 5}. For the repetition number "4" indicated by RAR UL grant, the second repetition number set can be determined as {4+0, 4+1, 4+2, 4+3}={4, 5, 6, 7}. For the repetition number "8" indicated by RAR UL grant, the second repetition number can be determined as {8+0, 8+1, 8+2, 8+3}={8, 9, 10, 11}. Accordingly, N=2 bits (e.g., 2 MSB) of the MCS field in DCI format 0_0 are used for indicating a repetition number from the second repetition number set.

In some examples in which the configuration of repetition offset set is absent (e.g., the network does not configure the repetition offset set to the UE), a default repetition offset set or a repetition offset set with default repetition number offsets is used to determine the second repetition number set in the manner described above. In some examples in which the configuration of repetition offset set is absent, a default second repetition number set or a second repetition number set with default repetition numbers is used for determining the repetition number for PUSCH scheduled by the DCI format 0_0.

The remaining bits (e.g., (5−N)=3 LSB) of the MCS field in DCI format 0_0 are used for indicating a MCS index from a MCS index set, for example, with at most $2^{4-N}$=8 MCS indices. The MCS indices within the MCS index set can be configured via RRC signaling. In the examples in which the network does not configure the MCS index set for the UE, a MCS index set with default MCS indices (e.g., MCS indices 0~7) can be used by the UE In some arrangement in which the repetition offset set contains negative values, some elements within the second repetition number set corresponding to those negative values are lesser than corresponding values in the first repetition number set. Such negative offset values may be considered as invalid values, and the UE uses a default value (e.g., 1) instead of the invalid values.

In some arrangements, the UE determines the repetition number of the at least one repetition of the retransmission by adding the repetition offset from a repetition offset set to the repetition number of the at least one repetition of the uplink transmission. In some arrangements, N=2 bits (e.g., 2 MSB) of the MCS field in DCI format 0_0 are used for indicating a repetition offset from the repetition offset set (e.g., {0,1, 2,3}). The UE determines the repetition number of PUSCH scheduled by the DCI format 0_0 by adding the indicated repetition offset and the repetition number indicated by RAR UL grant from the first repetition number set.

FIG. 8 is a table 800 illustrating example mapping between values of 2 bits (e.g., MSB) of a MCS field and values of repetition offset, in accordance with various arrangements. In the example in which "01" is indicated by the 2 MSB of the MCS field, the value of repetition offset is "1". In the example in which the repetition number indicated by RAR UL grant from the first repetition number set is "2," the repetition number of PUSCH scheduled by the DCI format 0_0 is "1+2=3".

In some arrangement in which the repetition offset set contains negative values, some elements within the second repetition number set corresponding to those negative values are lesser than corresponding values in the first repetition number set. Such negative offset values may be considered as invalid values, and the UE uses a default value (e.g., 1) instead of the invalid values.

Some arrangements relate to indicating a repetition number of retransmission of PUSCH scheduled by a RAR UL grant. The network schedules retransmission of a PUSCH scheduled by RAR UL grant using a DCI format 0_0 with CRC scrambled by TC-RNTI. In some arrangements in which there are a total of 5 bits of the MCS field in the DCI format 0_0 with CRC scrambled by TC-RNTI, N=2 bits (e.g., 2 MSBs) of the 5 bits are used for indicating the repetition number of PUSCH scheduled by the DCI format 0_0. Another (5−N)=3 bits (e.g., 3 LSB) of MCS field in the DCI format 0_0 are used for indicating a MCS for the PUSCH scheduled by the DCI format 0_0.

Figure 9:
FIG. 9 is a table illustrating example mapping between the values of bits of a MCS field and MCS indices, in accordance with various arrangements.

For example, a MCS index list with at most 8 MCS indices (e.g., MCS #0~MCS #7) is defined. In some examples, 3 bits (e.g., 3 LSBs) of the MCS field indicate one MCS index from the defined 8 MCS indices of the MCS index list according to a mapping relationship between value of the 3 bits and the MCS index. FIG. 9 is a table 900 illustrating example mapping between the values of 2 bits (e.g., MSBs) of a MCS field and MCS indices, in accordance with various arrangements. The mapping relationship in the table 900 can be defined in the specification or can be configured by the network via suitable signaling In some examples, a MCS index list with at most 8 MCS indices (e.g., MCS #{0, 1, 2, 4, 6, 8, 10, 16}) is configured by the network to the UE via RRC signaling. In some examples, 3 bits (e.g., 3 LSBs) of the MCS field indicate one MCS index from the configured 8 MCS indices according to a mapping relationship between the value of the 3 bits and the MCS indices. FIG. 10 is a table 1000 illustrating example mapping between the values of 3 bits (e.g., LSBs) of a MCS field and MCS indices, in accordance with various arrangements. The mapping relationship in the table 1000 can be defined in the specification or can be configured by the network via suitable signaling In some examples in which the configuration of the MCS index list is absent (e.g., the network does not configure the MCS index list for the UE), the UE uses a default MCS index list or a MCS index list with default MCS indices (e.g., MCS #0~7). In such examples, 3 bits (e.g., 3 LSBs) of the MCS field indicate one MCS index from the default MCS index list or the MCS index list with default MCS indices.

In some examples, the MCS indices for PUSCH scheduled by RAR UL grant is a subset of the MCS index list for PUSCH scheduled by DCI format 0_0 with CRC scrambled by TC-RNTI.

In some examples, the network can configure the subset via RRC signaling. That is, the network can configure the subset through selecting 4 MCS indices in MCS index list.

In some examples, the UE can determine the subset according to a rule. For example, a number of least MCS indices (e.g., the least four MCS indices, e.g., MCS #0, 1, 2, 4) in the MCS index list form a set. In some example, the odd or even elements of the MCS index list form the subset. For instance, a MCS index list is configured as MCS #{0, 1, 2, 4, 6, 8, 10, 16}. The even elements of the MCS index list (e.g., MCS #{0, 2, 6, 10}) form the subset. The 2 LSBs of MCS field in RAR UL grant are used for indicating a MCS index from the subset.

In the examples in which the configuration of the MCS index list is absent, (e.g., the network does not configure the MCS index to the UE), a default MCS index list or a MCS index list with default MCS indices (e.g., MCS #0~3) is used for PUSCH scheduled by RAR UL grant.

In some arrangements, the MCS index list for PUSCH scheduled by RAR UL grant is referred to as the first MCS index list. A MCS index offset list can be defined or configured via RRC signaling. A second MCS list for the PUSCH scheduled by a DCI format 0_0 with CRC scrambled by TC-RNTI is determined according the MCS index offset list and the MCS index indicated by RAR UL grant.

FIG. 11 is a table 1100 illustrating example mapping between the MCS indices indicated from the first MCS index list by RAR UL grant for PUSCH scheduled by RAR UL grant and the second MCS index list, in accordance with various arrangements. As an example shown in table 1100, the first repetition number set is configured as {0, 1, 2, 4}. One of the MCS indices from the first MCS index list is indicated by the network to the UE via RAR UL grant. The MCS index offset list with at most $2^N$ (e.g., N=3, and $2^N$=3) offset values is configured as {0, 1, 2, 3, 4, 5, 6, 7}. N is number of bits used for indicating MCS index in the MCS field of DCI format 0_0 with CRC scrambled by TC-RNTI.

In such example, the UE determines the second MCS index list according to a MCS index indicated by RAR UL grant and the repetition offset set. That is, each element in the second MCS index list is calculated by the UE by adding the MCS index indicated by RAR UL grant to each element of the MCS index offset list.

More specifically, for the MCS index "0" indicated by RAR UL grant, the UE determines the second MCS index list to be {0+0, 0+1, 0+2, 0+3, . . . , 0+7}={0, 1, 2, 3, . . . , 7}. For the MCS index "1" indicated by RAR UL grant, the UE determines the second MCS index to be {1+0, 1+1, 1+2, 1+3, . . . , 1+7}={1, 2, 3, 4, . . . , 8}. For the MCS index "2" indicated by RAR UL grant, the UE determines the second MCS index to be {2+0, 2+1, 2+2, 2+3, . . . , 2+7}={2, 3, 4, 5, . . . , 9}. For the MCS index "4" indicated by RAR UL grant, the UE determines the second MCS index to be {4+0, 4+1, 4+2, 4+3, . . . , 4+7}={4, 5, 6, 7, . . . , 11}. The network uses N=3 bits (e.g., 3 LSB) of MCS field in DCI format 0_0 to indicate a MCS index from the second MCS index list.

In the examples in which the configuration of the MCS index offset list is absent (e.g., the network does not configure the MCS index offset list to the UE), a default MCS index offset list or a MCS index list with default MCS index offsets is used to determine the second MCS index offset list.

In the examples in which the configuration of the MCS index offset list is absent, a default second MCS index list or a second MCS index list with default MCS indices is used for indicating the MCS index for PUSCH scheduled by the DCI format 0_0.

In some arrangement in which the MCS index offset list contains negative values, some elements within the second MCS index list corresponding to those negative values are negative values (e.g., lesser than 0). Such negative values may be considered as invalid values, and the UE uses a default value (e.g., 0) instead of the invalid values.

In some arrangements, the MCS index list for PUSCH scheduled by RAR UL grant can be configured via RRC signaling. A MCS index offset list can also be defined or configured via RRC signaling. N=3 bits (e.g., 3 LSBs) of the MCS field in DCI format 0_0 are used for indicating a MCS index offset from the MCS index offset list (e.g., {-4,-3,-2,-1,0,1,2,3}). The UE determines the MCS index of PUSCH scheduled by the DCI format 0_0 by adding the indicated MCS index offset and the MCS index indicated by RAR UL grant from the MCS index list.

Figures 12, 13:
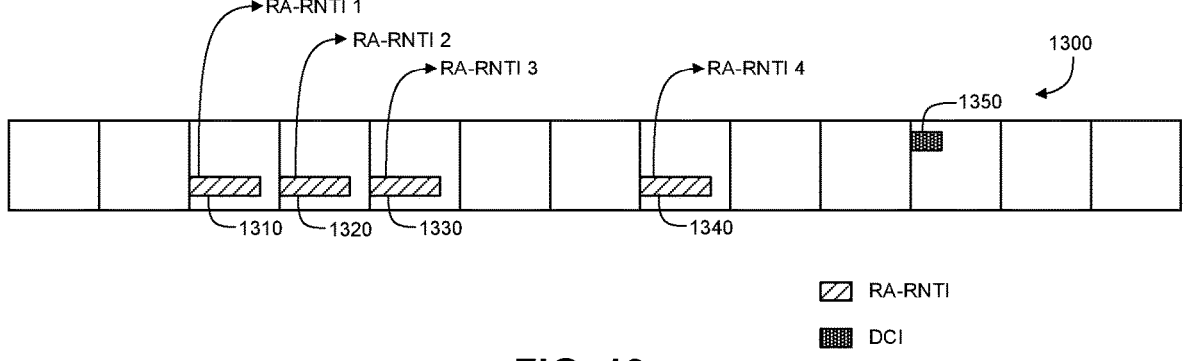
FIG. 12 is a table illustrating example mapping between values of bits of the MCS field and values of the MCS index offset, in accordance with various arrangements.
FIG. 13 is a diagram illustrating communication of preambles, according to various arrangements.

FIG. 12 is a table 1200 illustrating example mapping between values of bits (e.g., 3 LSBs) of the MCS field and values of the MCS index offset, in accordance with various arrangements. As shown, in the example in which "011" is indicated by the 3 LSBs of the MCS field, the value of MCS index offset is "-1." In the example in which the MCS index indicated by RAR UL grant from the MCS index list "2", the UE determines the MCS index of PUSCH scheduled by the DCI format 0_0 to be "-1+2=1".

In some arrangement in which the MCS index offset list contains negative values, some elements within the second MCS index list corresponding to those negative values are also negative values (e.g., lesser than 0). Such negative values may be considered as invalid values, and the UE uses a default value (e.g., 0) instead of the invalid values.

Some arrangements relate to indicating a repetition number of an uplink transmission (e.g., a PUSCH) scheduled by a RAR UL grant. In some arrangements in which PRACH repetition is supported, the UE uses two or more PRACH occasions to send a preamble repetitively. In some arrangements, the UE 104 determines an RA-RNTI based on a PRACH occasion of a plurality of PRACH occasions. The UE 104 determines a repetition number of at least one repetition of the uplink transmission based on the PRACH occasion.

FIG. 13 is a diagram illustrating communication of preambles, according to various arrangements. Referring to FIG. 13, a frame structure 1300 including slots that are denoted as boxes. The preamble are transmitted repetitively 4 times. There are four different PRACH occasions (PRACH resources 1310, 1320, 1330, and 1340) for the UE. The network (e.g., the baes statoin 102 selects one of the different PRACH occasions 1310, 1320, 1330, and 1340, which are in uplink slots, for determining the RA-RNTI. The RA-RNTI is used for scrambling Msg.2 PDCCH and/or PDSCH. Different RA-RNTIs can carry different information. Such information includes at least one of whether repetition is configured for PUSCH scheduled by RAR UL grant, the manner in which the MCS field in the RAR UL grant is interpreted, repetition number for PUSCH scheduled by RAR UL grant, transmission mode of PUSCH scheduled by RAR UL grant, and so on.

In some examples, four RA-RNTIs can be calculated according to four PRACH occasions with indices 1, 2, 3, 4. The relationship between PRACH occasion indices and repetition number of PUSCH scheduled by RAR UL grant can be defined in the specification or configured via RRC signaling. For example, PRACH occasion (PRACH resource 1310) is mapped to RA-RNTI 1. PRACH occasion (PRACH resource 1320) is mapped to RA-RNTI 2. PRACH occasion (PRACH resource 1330) is mapped to RA-RNTI 3. PRACH occasion (PRACH resource 1340) is mapped to RA-RNTI 4.

In some examples in which the network (e.g., the BS 102) selects PRACH occasion index 2 (PRACH resource 1320) for calculating the RA-RNTI, the network transmits a DCI format 1_0 1350 with CRC scrambled by the RA-RNTI for Msg.2 scheduling. A UE can blind descramble the DCI format using different RA-RNTIs (corresponding to PRACH occasions 1~4) and determines which RA-RNTI is used by the network. In other words, the DCI 1350 received in a downlink slot by the UE from the network can be blind descrambled by the UE using different RA-RNTIs 1-4 to determine the RA-RNTI used by the network. The UE can then determine repetition number of PUSCH scheduled by the RAR UL grant according to the relationship and what RA-RNTI is used by the network.

In some arrangements, the UE 104 determines an initial RA-RNTI based on a PRACH occasion. The UE 104 determines a repetition number of at least one repetition of the uplink transmission based on the initial RA-RNTI and an RA-RNTI offset. In some examples in which the PRACH is transmitted one time. In such examples, there is only on RA-RNTI (e.g., the initial RA-RNTI) that can be calculated according to the PRACH occasion. Some RA-RNTI offset can be configured for indicating the above information. FIG. 14 is a table 1400 illustrating an example mapping between PRACH occasion indices and repetition numbers of PUSCH scheduled by the RAR UL grant, in accordance with some arrangements. The relationship between RA-RNTI offset index and repetition number is configured via RRC signaling or defined in the specification.

The UE can determine the final RA-RNTI used for scrambling the PDCCH by adding the initial RA-RNTI and the RA-RNTI offset. FIG. 15 is a table 1500 illustrating RA-RNTI offset indices and repetition numbers of PUSCH scheduled by RAR UL grant, according to various arrangements. In the examples in which the network (e.g., the BS 102) configures the repetition number for PUSCH scheduled by RAR UL grant as "4," the RA-RNTI offset index is 3. The UE determines the final RA-RANTI by adding the initial RA-RNTI and RA-RNTI offset corresponding to RNTI offset index 3.

In some arrangements, the UE 104 determines a repetition number of at least one repetition of the uplink transmission based on a repetition number of PRACH transmission. For example, the repetition number of at least one repetition of the uplink transmission equals to the repetition number of at least one repetition of the PRACH transmission.

In another example, a scaling factor (K) is configured by the network to the UE 104, e.g., via RRC signaling, MAC layer signaling, or DCI. The repetition number of at least one repetition of the uplink transmission is K times of the repetition number of at least one repetition of the PRACH transmission. In some examples, K is a positive integer.

In some examples in which the PRACH is transmitted M times, the scaling factor K is configured for the UE 104. Then, the uplink transmission scheduled by RAR UL grant will be transmitted by the network to the UE 104 with repetition number of M×K times.

In some examples in which the PRACH is transmitted one time, the scaling factor K is configured for the UE. There are two cases for determining the repetition number of at least one repetition of the uplink transmission scheduled by RAR UL grant. One way is that the UE 104 determines the repetition number of at least one repetition of the uplink transmission as K. Another way is that the UE 104 determines the repetition number of at least one repetition of the uplink transmission according the MCS field in RAR UL grant, e.g., the 2 MSBs of the MCS field used for indicating the repetition number of the uplink transmission, and the 2 LSBs of the MCS field used for indicating the MCS.

In another example, an offset value N is configured by the network to the UE 104, e.g., via RRC signaling, MAC layer signaling, or DCI. The repetition number of at least one repetition of the uplink transmission is determined by adding the offset value and the repetition number of the PRACH transmission. In some examples, N is a non-negative integer.

In some examples in which the PRACH is transmitted M times, the offset value N is configured for the UE 104. Then, the uplink transmission scheduled by RAR UL grant will be transmitted by the network to the UE 104 with repetition number of M+N times.

Accordingly, the number of repetitions can be effectively indicated without additional signaling overhead and without significantly increasing the detection complexity of terminals.

While various arrangements of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one arrangement can be combined with one or more features of another arrangement described herein. Thus, the breadth and scope of the present disclosure should not be limited by any of the above-described illustrative arrangements.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to arrangements of the present solution.

Additionally, memory or other storage, as well as communication components, may be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed:

1. A method comprising:
determining, by a wireless communication device, a first list of modulation and coding scheme (MCS) indices, for transmission of a Msg3 retransmission scheduled by a downlink control information (DCI) format 0_0 with cyclic redundancy check (CRC) scrambled by a traffic control radio network temporary identifier (TC-RNTI);
determining, by the wireless communication device, a second list of MCS indices comprising a subset of the first list of MCS indices, for transmission of an initial Msg3 transmission scheduled by a random access response (RAR) uplink grant, wherein the Msg3 retransmission is a retransmission of the initial Msg3 transmission;
determining, by the wireless communication device, a first MCS index from the first list of MCS indices, according to a mapping relationship between values of three least significant bits (LSBs) of an MCS field in the DCI format 0_0 and the first list of MCS indices; and
determining, by the wireless communication device, a second MCS index from the second list of MCS indices, using two LSBs of an MCS field in the RAR uplink grant and the second list of MCS indices.

2. The method of claim 1, wherein the subset of the first list of MCS indices comprises least four MCS indices in the first list of MCS indices.

3. The method of claim 1, comprising:
determining, by the wireless communication device, a list of MCS indices configured by a network node, to be the first list of MCS indices.

4. The method of claim 1, comprising:
determining, by the wireless communication device, a default list of MCS indices to be the first list of MCS indices, when there is an absence of a list of MCS indices configured by a network node.

5. The method of claim 4, wherein the default list of MCS indices comprises {0, 1, 2, 3, 4, 5, 6, 7}.

6. A wireless communication device, comprising:
at least one processor configured to:
determine a first list of modulation and coding scheme (MCS) indices, for transmission of a Msg3 retransmission scheduled by a downlink control information (DCI) format 0_0 with cyclic redundancy check (CRC) scrambled by a traffic control radio network temporary identifier (TC-RNTI);
determine a second list of MCS indices comprising a subset of-the first list of MCS indices, for transmission of an initial Msg3 transmission scheduled by a random access response (RAR) uplink grant, wherein the Msg3 retransmission is a retransmission of the initial Msg3 transmission;
determine a first MCS index from the first list of MCS indices, according to a mapping relationship between values of three least significant bits (LSBs) of an MCS field in the DCI format 0_0 and the first list of MCS indices; and
determine a second MCS index from the second list of MCS indices, using two LSBs of an MCS field in the RAR uplink grant and the second list of MCS indices.

7. The wireless communication device of claim 6, wherein the subset of the first list of MCS indices comprises least four MCS indices in the first list of MCS indices.

8. The wireless communication device of claim 6, wherein the at least one processor is configured to:

determine a list of MCS indices configured by a network node, to be the first list of MCS indices.

9. The wireless communication device of claim 6, wherein the at least one processor is configured to:

determine a default list of MCS indices to be the first list of MCS indices, when there is an absence of a list of MCS indices configured by a network node.

10. The wireless communication device of claim 9, wherein the default list of MCS indices comprises {0, 1, 2, 3, 4, 5, 6, 7}.

11. A method comprising:

receiving, by a wireless network device, an initial Msg3 transmission on physical uplink shared channel (PUSCH) scheduled by a random access response (RAR) uplink grant, and the second PUSCH is transmitted according to a second list of modulation and coding scheme (MCS) indices, wherein a second MCS index of the second list of MCS indices is determined using two least significant bits (LSBs) of an MCS field in the RAR uplink grant; and receiving, by the wireless network device, a Msg3 retransmission on the PUSCH scheduled by a downlink control information (DCI) format 0_0 with cyclic redundancy check (CRC) scrambled by a traffic control radio network temporary identifier (TC-RNTI), and the first PUSCH is transmitted according to a first list of at most eight MCS indices configured for the wireless communication device via radio resource control (RRC) signaling, wherein a first MCS index of the first list of MCS indices is determined using an MCS field in the DCI format 0_0 and according to a mapping relationship between values of three LSBs of the MCS field and the first list of MCS indices, wherein the second list of MCS indices comprises the first list of MCS indices, and the Msg3 retransmission is a retransmission of the initial Msg3 transmission.

12. The method of claim 11, wherein the subset of the first list of MCS indices comprises least four MCS indices in the first list of MCS indices.

13. A wireless network device, comprising:

at least one processor configured to:

receive, via a receiver, an initial Msg3 transmission on a physical uplink shared channel (PUSCH) scheduled by a random access response (RAR) uplink grant, according to a second list of modulation and coding scheme (MCS) indices, wherein a second MCS index of the second list of MCS indices is determined using two least significant bits (LSBs) of an MCS field in the RAR uplink grant; and receive, via the receiver, a Msg3 retransmission on the PUSCH scheduled by a downlink control information (DCI) format 0_0 with cyclic redundancy check (CRC) scrambled by a traffic control radio network temporary identifier (TC-RNTI), the Msg3 retransmission transmitted according to a first list of at most eight MCS indices configured for the wireless communication device via radio resource control (RRC) signaling, wherein a first MCS index of the first list of MCS indices is determined using an MCS field in the DCI format 0_0 and according to a mapping relationship between values of three LSBs of the MCS field and the first list of MCS indices, wherein the second list of MCS indices comprises a subset of the first list of MCS indices, and the Msg3 retransmission is a retransmission of the initial Msg3 transmission.

14. The wireless network device of claim 13, wherein the subset of the first list of MCS indices comprises least four MCS indices in the first list of MCS indices.

* * * * *